United States Patent [19]
Schmidt

[11] Patent Number: 5,018,819
[45] Date of Patent: May 28, 1991

[54] METHOD FOR CENTERING AND MOUNTING A LIGHT WAVEGUIDE IN A SLEEVE, AND APPARATUS FOR USE IN THE METHOD

[75] Inventor: Bernhard Schmidt, Neunkirchen, Fed. Rep. of Germany

[73] Assignee: Ant Nachrichtentechnik GmbH, Backnang, Fed. Rep. of Germany

[21] Appl. No.: 534,264

[22] Filed: Jun. 7, 1990

[30] Foreign Application Priority Data

Jun. 15, 1989 [DE] Fed. Rep. of Germany ....... 3919532

[51] Int. Cl.$^5$ .............................................. G02B 6/36
[52] U.S. Cl. .................................. 350/96.20; 350/320
[58] Field of Search ............... 350/96.20, 96.21, 96.22, 350/320

[56] References Cited

U.S. PATENT DOCUMENTS

| | | | |
|---|---|---|---|
| 4,134,641 | 1/1979 | Kao et al. | 350/96.21 |
| 4,440,471 | 4/1984 | Knowles | 350/96.20 |
| 4,482,201 | 11/1984 | Dousset | 350/96.20 |
| 4,763,980 | 8/1988 | Gerber et al. | 350/96.20 |

FOREIGN PATENT DOCUMENTS

| | | |
|---|---|---|
| 0094906 | 7/1987 | European Pat. Off. . |
| 3442822 | 1/1989 | Fed. Rep. of Germany . |
| WO82/01077 | 4/1982 | PCT Int'l Appl. . |

*Primary Examiner*—John D. Lee
*Attorney, Agent, or Firm*—Spencer & Frank

[57] ABSTRACT

A light waveguide such as a monomode fiber is inserted into a bore in a body of ductile material, and is mounted and centered using a deformation punch having individual needles which can be moved independently of one another. This provides an improvement over a conventional technique, in which an annular punch is initially employed to exert pressure on the end face of a core member symmetrical to the axis of a sleeve having the core member. For adjustment in accordance with the conventional technique, an asymmetrical pressure is exerted onto the end face in a further process step, with individual punches serving as deformation tools.

7 Claims, 1 Drawing Sheet

METHOD FOR CENTERING AND MOUNTING A LIGHT WAVEGUIDE IN A SLEEVE, AND APPARATUS FOR USE IN THE METHOD

CROSS-REFERENCE TO RELATED APPLICATION

This application claims the priority of application Ser. No. 39 19 532.5, filed June 15th, 1989 in the Federal Republic of Germany, the subject matter of which is incorporated herein by reference.

BACKGROUND OF THE INVENTION

The present invention relates to a method of centering and mounting a light waveguide or optical fiber in a sleeve, and more particularly to a centering and mounting method of the type wherein the sleeve is composed in part, at least at one end face, of a body of ductile material having a bore which is coaxial to the sleeve axis, the light waveguide is pushed into the body, and an upsetting tool is employed to exert pressure onto the end face of the body. The invention also relates to a sleeve which includes a waveguide that has been centered and fixed, and then cut off flush with the end face of the sleeve. The invention further relates to an apparatus of the type which includes an upsetting tool.

European 94,906 discloses the centering and mounting of a light conductive fiber in a light waveguide end piece, with the fiber being freed of its protective layer and being pushed into a centering cylinder. The centering cylinder is composed of a hollow cylindrical outer member made of a relatively hard material filled at least in the region of the end face with a core member of a plastically deformable material. The core member includes an axial bore to accommodate the fiber end. An annular upsetting tool is pressed against the end face of the core member so that the upsetting tool concentrically surrounds the bore holding the fiber and the material around the fiber is plastically deformed, thus fixing the fiber end centrally relative to the outer faces of the centering cylinder.

The centering and mounting of the fiber is thus effected by a symmetrical pressure on the end face of a ductile core member. In this process, slight residual deviations cannot be avoided. However, these residual deviations may have a negative effect, particularly when monomode fibers are mounted. For example, light losses may occur if two monomode fibers mounted in this manner are fixed one on top of the other in a groove accommodating the two centering cylinders.

German Patent 3,442,822 discloses a method with which an already-fixed light conductive fiber can be accurately centered in the sleeve. To accomplish this, a pressure that is asymmetrical relative to the sleeve axis is exerted on the core member. This pressure produces a radial displacement and the light waveguide end section is finely adjusted relative to the sleeve axis.

U.S. Pat. No. 4,763,980 also discloses the centering of a light conductive fiber by eccentric pressure from a tool acting in the axial direction. Initially, the light conductive fiber is fixed and preliminarily centered by means of an annular upsetting tool and then it is centered by means of a segment-shaped upsetting tool.

The light waveguide is thus mounted and centered in the sleeve in a two step process. First, an annular upsetting tool is used to provide the fixing. Then a further upsetting tool exerts an asymmetrical pressure and thus finely adjusts the light waveguide. This procedure has the drawback that two process steps are required. Another drawback is that the light waveguide is fixed by pressure onto the ductile core member by means of the annular upsetting tool over only a very short section of the core member, at its end face. This can be compensated by gluing the light waveguide in the bore over the rest of its course. However, fine adjustment is possible only as long as this adhesive has not set. The low penetration depth of the annular upsetting tool, and thus the small region in which the fiber is fixed, is particularly disadvantageous if the sleeve including the core member (which is made of a deformable material) and the light waveguide are to be ground after the light waveguide has been fixed. This is necessary in order to obtain a planar end face and a light waveguide that is embedded therein in a planar manner. If, however, the light waveguide is fixed only over a small region at the end face, the danger exists that the grinding may destroy the attachment.

SUMMARY OF THE INVENTION

It is therefore an object of the present invention to provide a method with which a light waveguide can be accurately adjusted relative to the sleeve axis and mounted in the sleeve in one process step, and wherein the fiber is fixed over a broad range.

It is another object of the invention to provide an apparatus with which the above method can be implemented, and to provide a sleeve including an adjusted and fixed light waveguide.

This is accomplished, with respect to the method, by using needles as the upsetting or deformation tool, the needles permitting a great penetration depth into the body and being actuatable independently of one another so as to center and fix the light waveguide into the body. The end face of the body and the light waveguide may be ground away after the light waveguide is centered and mounted. Regarding the apparatus for centering and mount a light waveguide in a sleeve, the object can be attained by providing a deformation tool having a plurality of needles which are distributed along a circular path, the needles being movable independently of one another. The needles may have portions which are conically configured and which have respective cone angles of approximately 15°. Furthermore, a sleeve including a light waveguide may be made by centering and mounting the light waveguide into the body and by then cutting the light waveguide off flush with the end face of the body.

The use according to the invention of an upsetting or deformation tool in the form of needles which have a great penetration depth into the ductile body results in a firm seat for the light waveguide in the sleeve. This firm seat is produced because the great penetration depth fixes the fiber over a wide range (i.e., for a relatively large length). The end face of the sleeve including the body of deformable material and the light waveguide may be ground without the seat of the fiber becoming loose.

Moreover, it is possible with the method according to the invention to mount and center the light waveguide in the sleeve in one process step. This becomes possible, in particular, in that the needles serving as the distortion tool can be actuated together as well as independently of one another. For example, in order to mount the light waveguide, all needles may initially press uniformly onto the end face of the deformable body and then, for centering, individual needles penetrate even deeper into the body of ductile material. A slightly conical configuration of the needles thus permits both mounting and adjustment without having to place the needles at new insertion points for centering. The great penetration depth of the needles is ensured, in particular, in that the cone angle of the needles is very small.

It is a further advantage that the mounting can be accomplished without an adhesive. Since only one process step is required, the mounting and centering of the light waveguide in the sleeve can be effected very quickly.

In the apparatus according to the invention it is a particular advantage that only one deformation tool in the form of individual needles is required.

The sleeve according to the invention including a light waveguide may have very different configurations. It is only necessary that it is partially composed of a body of ductile material, that is, at least at its end face. This body may be surrounded by a solid outer sleeve or may open axially into a sleeve of a harder material. Both embodiments are appropriate for plug-in connectors.

DESCRIPTION OF THE PREFERRED EMBODIMENTS

Figure 1:
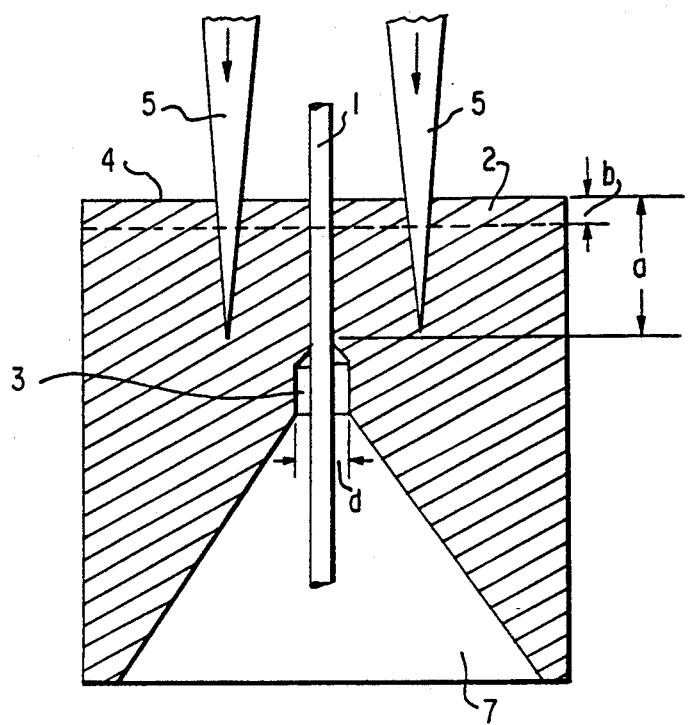
FIG. 1 is a cross-sectional view illustrating a body made of a deformable material, a mounted and adjusted light waveguide, nd a deformation tool.

FIG. 1 is a cross section of a body 2 of ductile material. Body 2 may be composed, for example, of brass or nickel silver. Body 2 may be affixed to an outer member to form a cylindrical sleeve, as will be discussed in more detail later in conjunction with FIGS. 3 and 4, with the end face 4 of body 2 being disposed at the end face of the sleeve.

Body 2 has a bore 3 which coincides with the sleeve axis of the cylindrical sleeve of which body 2 is a part. Bore 3 extends from end face 4 of body 2 to a point at which it changes into a conical opening recess 7. This conical opening recess 7 makes it particularly easy to insert an optical fiber or light waveguide 1 into bore 3. Light waveguide 1 is pushed into bore 3 in such a manner that its end projects somewhat beyond end face 4.

In order to mount and adjust the light waveguide 1, an upsetting or deformation tool composed of individual needles 5 is then pressed onto the end face 4 of body 2. Needles 5 are arranged on a circle whose center coincides with the center of bore 3. The application of force in the direction indicated in FIG. 1 causes needles 5 to penetrate into body 2. The penetration of needles 5 causes bore 3 to be deformed and light waveguide 1 is mounted and adjusted. The clamping length a, that is, the length over which light waveguide 1 is fixed, is very long. It is determined by the penetration depth of needles 5. For adjustment it is possible to cause needles 5 to penetrate independently of one another, that is, to different depths, in order to compensate for any centering errors by causing the position of light waveguide 1 to shift slightly. Once the needles 5 have been removed, the end face of body 2 and the light waveguide 1 can be ground away by an amount b, and such grinding will not reduce the durability of the connection. Alternatively, the projecting stub of light waveguide 1 can be cut off flush with the end face 4.

Figure 2:
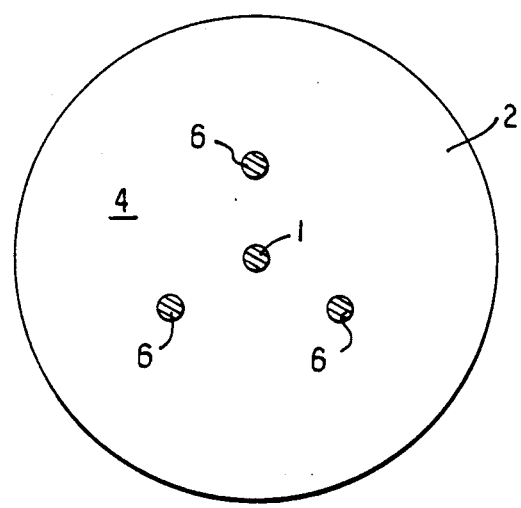
FIG. 2 is a top view of the end face of a body of ductile material including a light waveguide and visible needle holes.

The sleeve including light waveguide 1 is provided, at the end face of body 2, with deep recesses 6 produced by needles 5. The end face 4 of body 2 is shown in FIG. 2.

An apparatus for centering and mounting a light waveguide includes at least three needles 5 as the deformation tool. The needles 5 are oriented parallel to one another and are distributed over a circle. The needles 5 must be distributed over the circle in such a manner that adjustment of the light waveguide 1 is possible in every transverse direction. To accomplish this, at least three needles 5 are required. However, four, five or more needles 5 may also be employed. The needles 5 must be actuatable independently of one another in order to allow adjustment. However a joint actuation of the needles 5 in order to preliminarily fix the light waveguide is appropriate.

The needles may have very different configurations. For example, they may have a round, triangular, or hexagonal cross section, and may have a frustoconical or hemispherical tip.

Figure 3:
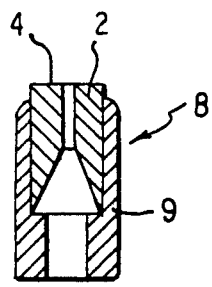
FIG. 3 and 4 are cross-sectional views of two different configurations of cylindrical sleeves, which are partly composed of a body of ductile material.
Figure 4:
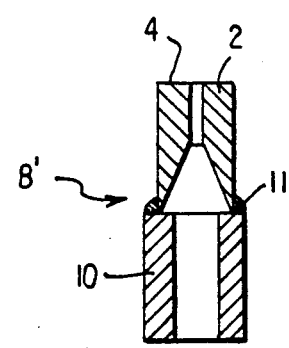

FIG. 3 is a cross-sectional view of a cylindrical sleeve 8. It is partially composed of a body 2 of ductile material. This body 2 is surrounded by a solid cylindrical outer member 9. The end of body 2 with the end face 4 protrudes from the outer member 9. The body 2 may be fixed by a forced fit in the outer member 9. Another cylindrical sleeve 8 is shown in FIG. 4. The body 2 opens axially into a sleeve 10 of a harder material. The body 2 may be fixed by glue 11 on the sleeve 10 of harder material.

The minimum acceptable penetration depth is about 3 times the diameter of the waveguide. A preferred penetration depth is 4 times the diameter of the waveguide, that is about 0.7 mm. It will be understood that the above description of the present invention is susceptible to various modifications, changes, and adaptations, and the same are intended to be comprehended within the meaning and range of equivalents of the appended claims.

What I claim is:

1. A method of centering and fixing a light waveguide in a sleeve having an axis and an end face, the sleeve being composed in part, at least at the end face, of a body of ductile material having a bore which is coaxial to the sleeve axis, said method comprising the steps of:
   (a) pushing the light waveguide into the bore; and
   (b) exerting pressure on the end face of the body with a deformation tool having needles capable of penetration into the body to a substantial depth, the needles being movable independently of one another so as to fix and center the light waveguide into the body.

2. The method of claim 1, further comprising the step of grinding away the end face of the body and the light waveguide after step (b) is completed.

3. The method of claim 1, further comprising the step of cutting the light waveguide off flush with the end face of the body after step (b) is completed.

4. An apparatus for centering and fixing a light waveguide in a sleeve having an axis and an end face, the sleeve being composed in part, at least at the end face, of a body of ductile material having a bore which is coaxial to the sleeve axis, comprising:

a deformation tool having needles capable of penetration into the end face of the body to a substantial depth after the light waveguide has been pushed into the bore, the needles being distributed along a circular path and being movable independently of one another so as to fix and center the light waveguide into the body.

5. The apparatus of claim 4, wherein the needles have portions which are conically configured and which have respective cone angles of approximately 15°.

6. The apparatus of claim 4, wherein the needles are oriented parallel to one another.

7. The apparatus of claim 4, wherein there are at least three needles.

* * * * *